United States Patent

Acello

[15] 3,665,267

[45] May 23, 1972

[54] CERAMIC CAPACITOR TERMINALS

[72] Inventor: Salvatore J. Acello, North Adams, Mass.

[73] Assignee: Sprague Electric Company, North Adams, Mass.

[22] Filed: Sept. 16, 1970

[21] Appl. No.: 72,712

[52] U.S. Cl. .......................... 317/258, 317/101 CC, 317/261

[51] Int. Cl. .......................... H01g 1/14

[58] Field of Search .......................... 317/258, 261, 101 CC; 29/195 M

[56] References Cited

UNITED STATES PATENTS

| | | | |
|---|---|---|---|
| 2,996,401 | 8/1961 | Welch | 29/195 M |
| 3,303,393 | 2/1967 | Hymes | 317/101 CC |
| 3,324,362 | 6/1967 | Tassara | 317/261 X |
| 3,444,436 | 5/1969 | Coda | 317/261 X |
| 3,456,159 | 7/1969 | Davis | 317/101 CC |
| 3,503,721 | 3/1970 | Lupfer | 317/101 CC |
| 3,550,228 | 12/1970 | Asscher | 317/101 CC |

*Primary Examiner*—E. A. Goldberg
*Attorney*—Connolly and Hutz and Vincent H. Sweeney

[57] ABSTRACT

A monolithic multi-electrode ceramic capacitor chip has silver electrode pickups on opposed edges of the capacitor stack. A multi-metal clad strip is affixed on the silver pickup, thereby affording a smooth compatible terminal surface for further bonding purposes for use in hybrid circuitry.

5 Claims, 3 Drawing Figures

CERAMIC CAPACITOR TERMINALS

BACKGROUND OF THE INVENTION

This invention relates to ceramic capacitor terminals, and more particularly to ceramic capacitors utilizing clad metal terminals as a base for the bonding of electrical wires in hybrid circuitry.

Hybrid circuitry quite often requires the bonding of aluminum or gold wires to multi-electrode ceramic capacitors. It is well known in the art that it is difficult to solder aluminum, or otherwise attach aluminum onto a metallized ceramic device. One method sometimes employed is to vacuum evaporate aluminum onto the existing silver metallization. This requires a costly initial outlay for equipment, exceptionally good technique, and a masking of the ceramic surface. Also, this method does not render a very smooth metal surface for terminal contacts. Another method used in the past is a metallization technique, whereby the metallized chip is dipped into a molten metal bath using a fused salt cover over the molten metal to insure that no oxidation of the metal takes place. This technique is very tedious, and does not always give a good connection. Also, the use of strong corrosive fluxes for this purpose could damage the device irreparably. Some fluxes cause electrolytic migration of fluoride ions from the flux which would adversely affect the life span of the ceramic device. Also, while such components may function properly when they are initially installed, they are subject to breakdown at the moment they are needed most. Concerning gold terminals, plating methods have been employed in the past, but this provides a surface for the terminal that is uneven and bumpy.

The present invention eliminates these problems, requires less technique, and produces a smooth metal surface for further bonding purposes.

It is an object of the present invention to provide a ceramic capacitor wherein a metallic terminal on the capacitor is a multi-metal clad strip comprising a terminal surface and a solderable surface.

It is another object of the present invention to provide a ceramic capacitor terminal construction wherein an aluminum terminal is secured to a metallized monolithic capacitor providing a smooth compatible surface for the ultrasonic bonding of aluminum wires.

Still another object is to provide a strong metallurgical bond between aluminum and solderable metal without the use of strong corrosive fluxes.

A further object of the invention is to provide a monolithic ceramic capacitor construction wherein a smooth and even surface of gold is secured as a terminal for bonding gold wires thereto.

And a still further object of the invention is to provide such a gold terminal that has a core of another metal such as nickel between it and the solderable metal, namely copper, which would act as a buffer zone that inhibits the migration of copper to the gold surface.

SUMMARY OF THE INVENTION

A multi-metal clad strip, having one surface of a relatively non-solderable metal, and the other surface of a solderable metal such as brass or copper, is attached by soldering the solderable surface to the metallized electrode pickup of a multi-electrode ceramic device. In a preferred embodiment of the invention, a clad metal, having an aluminum surface on one side and a copper surface on the other side, is attached to a monolithic ceramic capacitor chip by means of solder or tin. The tin being clad onto the copper side of the metal strip, or if solder is used this should be applied on the copper side also. The attachment of the clad metal strip renders a smooth, compatible aluminum surface for the ultrasonic bonding of aluminum wires for use in hybrid circuitry. This invention does not require special tedious technique and can be adequately performed by a production worker. And because tin or solder is used for making the surface connection to the ceramic device, there is not present the dangers involved in using strong corrosive fluxes.

In another embodiment of the invention, a clad metal having a gold surface on one side, a copper surface on the other side, and a core of nickel, is attached to the monolithic ceramic capacitor chip by means of solder or tin. Again, if tin is used it is clad on the metal strip on the copper side. Attaching this clad metal strip to the ceramic device renders a smooth surface of gold for the ultrasonic bonding of gold wires that are used in hybrid micro-circuits. The nickel core is employed to inhibit the migration of copper to the gold surface, as this could cause the formation of undesirable oxides on the gold terminal. This invention produces a smooth gold surface, whereas a rather bumpy surface would be formed if gold were simply plated onto the silver electrodes, which would not be very conducive to producing a strong metallurgical bond. Also, electroplating ceramic devices may cause the glass frits used in such devices to degenerate, as they are susceptible to breakdown in plating baths.

DESCRIPTION OF ILLUSTRATIVE EMBODIMENTS

Figure 1:
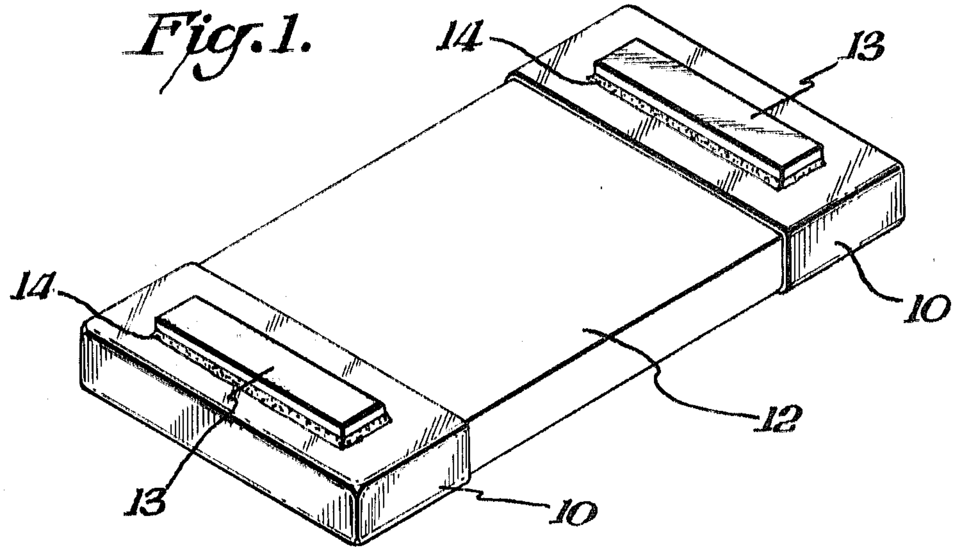
FIG. 1 is a perspective view of an embodiment of the invention.

Referring to FIG. 1, there is shown a monolithic ceramic capacitor 12 which has silver electrodes 10 coated on its opposed ends. A multi-metal clad strip 13 is secured on the silver electrode 10 by means of tin or solder 14.

Figure 2:
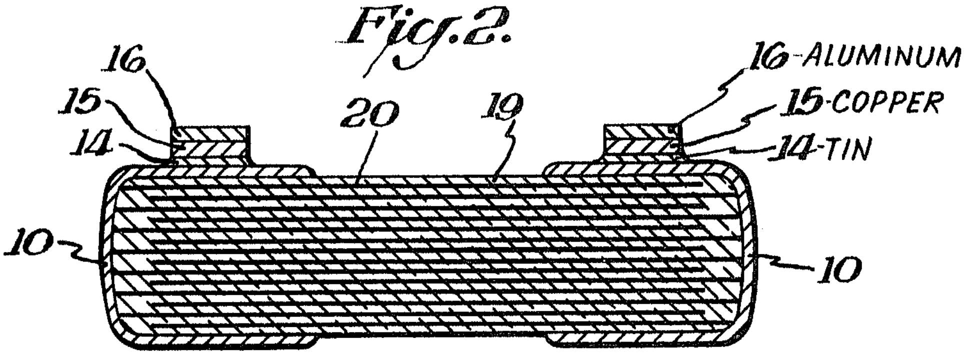
FIG. 2 is a sectional view of the capacitor, showing the clad metal terminal mounts.

Referring to FIG. 2, a capacitor has multiple internal electrodes 20 with ceramic dielectric spacers 19 and silver electrode pickups 10 on opposed edges of the capacitor stack. A strip of aluminum 16 is clad with copper 15 and clad with tin 14 on that same side. This clad strip is then attached by heating, to the silver electrode 10 surface, thus forming a tight, strong metallurgical bond with said silver electrode 10. Representative methods of clading metal strips are: (a) by brazing; (b) by plating; (c) by forge-welding; (d) by rolling.

Figure 3:
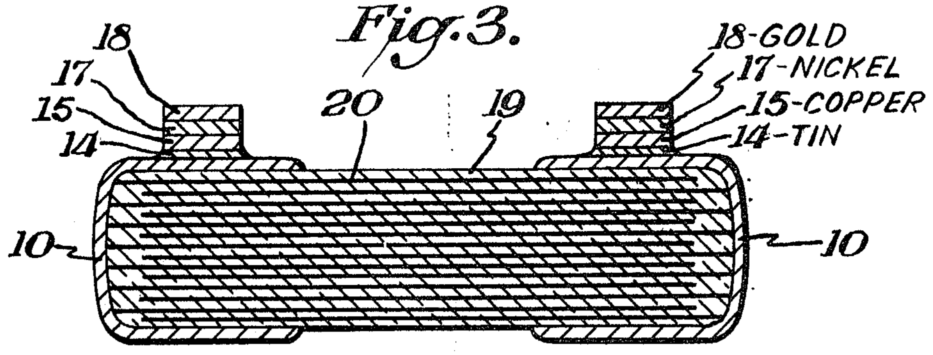
FIG. 3 is a sectional view of still another embodiment of the invention.

And referring to FIG. 3, another embodiment of the invention is shown wherein a capacitor having multiple internal electrodes 20 with ceramic dielectric spacers 19 and silver electrode pickups 10 on opposed edges of the capacitor stack. A copper strip 15 is clad with tin 14 on one side and clad with nickel 17 on the other side, and then clad with gold 18 on the same (nickel) side, and attached to the silver electrodes 10 on the tin 14 side of the said clad metal strip, thus forming a strong metallurgical bond that provides a smooth gold 18 terminal that will not form undesirable oxides with migrating copper 15 because of the nickel 17 buffer zone.

Modifications and variations can be made in the embodiments illustrated and described without departing from the spirit and scope of my invention.

What is claimed is:

1. A metallic terminal attached to a monolithic ceramic capacitor having a metallic electrode pickup, wherein said terminal comprises a multimetal clad strip with a terminal surface and a solderable surface attached to said pickup, and said solderable surface includes a copper surface joined to said pickup by a tin-containing surface.

2. The terminal of claim 1 wherein said terminal surface is a strip of aluminum, and said copper surface is clad on the other side of said aluminum strip.

3. The terminal of claim 1 wherein said terminal surface is a gold surface clad onto a nickel surface which is clad onto a copper strip, and said copper strip is said copper surface.

4. The terminal of claim 1 wherein said terminal surface is a strip of aluminum onto which is clad said copper surface, and said tin-containing surface is a tin surface clad onto said copper surface.

5. The terminal of claim 1 wherein said terminal surface is a gold surface clad onto a nickel surface that is clad onto a copper strip, and said tin-containing surface is tin clad on the other side of said copper strip.

* * * * *